US010009583B2

(12) United States Patent
Ito

(10) Patent No.: US 10,009,583 B2
(45) Date of Patent: Jun. 26, 2018

(54) PROJECTION SYSTEM, PROJECTION APPARATUS, INFORMATION PROCESSING METHOD, AND STORAGE MEDIUM

(71) Applicant: CANON KABUSHIKI KAISHA, Tokyo (JP)

(72) Inventor: Hidenori Ito, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/183,521

(22) Filed: Jun. 15, 2016

(65) Prior Publication Data
US 2016/0373703 A1   Dec. 22, 2016

(30) Foreign Application Priority Data

Jun. 18, 2015   (JP) ................. 2015-123139

(51) Int. Cl.
*H04N 9/31*  (2006.01)
*H04N 5/445*  (2011.01)
*H04N 5/45*  (2011.01)

(52) U.S. Cl.
CPC ......... *H04N 9/3147* (2013.01); *H04N 9/3182* (2013.01); *H04N 5/44543* (2013.01); *H04N 5/45* (2013.01)

(58) Field of Classification Search
CPC ............... H04N 9/3147; H04N 9/3182; H04N 5/44543; H04N 5/45
USPC ................. 348/734, 744, 566, 564–565, 569; 345/601, 604, 619
See application file for complete search history.

(56) References Cited

U.S. PATENT DOCUMENTS

| 6,540,365 | B1 * | 4/2003 | Fujiwara | G09G 3/002 345/619 |
|---|---|---|---|---|
| 6,712,476 | B1 * | 3/2004 | Ito | G09G 3/002 345/522 |
| 6,932,481 | B2 * | 8/2005 | Koyama | H04N 5/44513 345/619 |
| 8,593,482 | B2 * | 11/2013 | Furui | G03B 37/00 345/581 |
| 9,292,945 | B2 * | 3/2016 | Kubota | G06T 11/003 |
| 2005/0283344 | A1 * | 12/2005 | Moscovitch | G06F 3/1446 702/189 |

FOREIGN PATENT DOCUMENTS

JP          2008-107477 A       5/2008

* cited by examiner

*Primary Examiner* — Trang U Tran
(74) *Attorney, Agent, or Firm* — Canon U.S.A. Inc., IP Division

(57) ABSTRACT

A projection apparatus among a plurality of projection apparatuses for executing multi-projection includes a holding unit configured to hold setting information about a role of the projection apparatus among the plurality of projection apparatuses for executing the multi-projection, a reception unit configured to receive an instruction for displaying a menu screen for changing a setting of the projection apparatus, a determination unit configured to determine whether to display the menu screen upon reception of the instruction by the reception unit, based on the setting information held by the holding unit, and a projection unit configured to project the menu screen according to a result of determination by the determination unit.

14 Claims, 11 Drawing Sheets

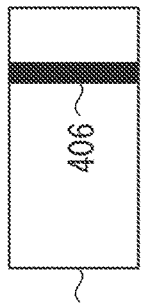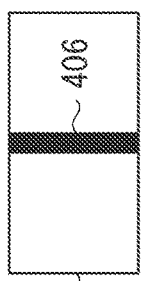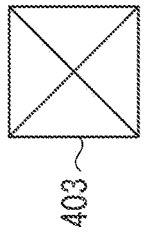

NO OPERATION INSTRUCTION

IMAGE QUALITY BUTTON IS PRESSED

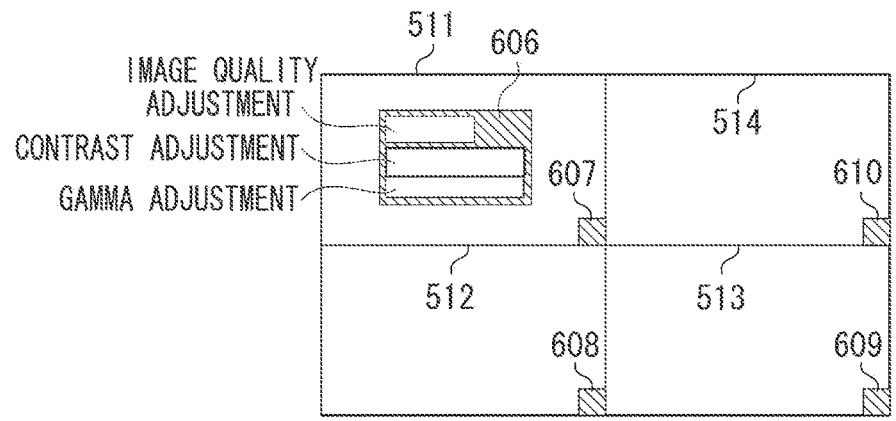
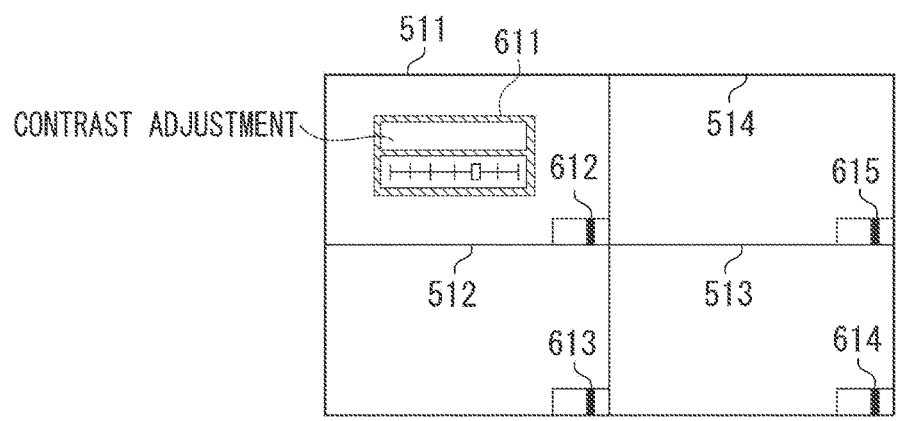
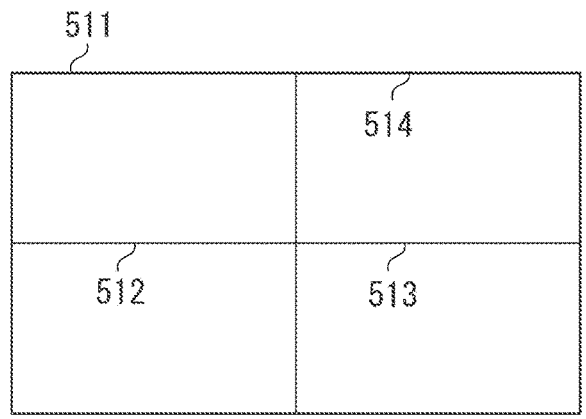

PROJECTION SYSTEM, PROJECTION APPARATUS, INFORMATION PROCESSING METHOD, AND STORAGE MEDIUM

BACKGROUND OF THE INVENTION

Field of the Invention

The present invention relates to a projection system, a projection apparatus, an information processing method, and a storage medium.

Description of the Related Art

A multi-projection system has recently been put to practical use as a method for meeting needs for a larger projection screen of a projector. In a multi-projection system, the projection screens of a plurality of projectors are combined to construct a single screen. If a plurality of projectors is used to construct a single screen, adjustments for the output video images of the projectors, such as an image quality adjustment, need to be made to all the projectors. The reason is that if an image quality adjustment is made to only one of the projectors, only a part of the single screen constructed by the projection screens of all the projectors becomes different in the image quality adjustment, which results in an unnatural composite screen.

Japanese Patent Application Laid-Open No. 2008-107477 discusses a technique for making the same operation on all projectors in a multi-projection system constituted by a plurality of projectors. In the technique, one of the projectors constituting the multi-projection system serves as a master projector. All the projectors are connected by network cables. The contents of operations on the master projector are then transmitted to all the projectors via the network.

According to the foregoing technique, the projectors constituting the multi-projection system need to include a network interface for transmitting and receiving the operation contents in addition to an interface for receiving a video image for the projectors to project. Troublesome operations such as installation, setting, and management of the network are also required. This causes a problem of increased cost due to increased functionality of the projectors themselves and the man-hours for network management.

SUMMARY OF THE INVENTION

According to an aspect of the present invention, a projection apparatus among a plurality of projection apparatuses for executing multi-projection includes a holding unit configured to hold setting information about a role of the projection apparatus among the plurality of projection apparatuses for executing the multi-projection, a reception unit configured to receive an instruction for displaying a menu screen for changing a setting of the projection apparatus, a determination unit configured to determine whether to display the menu screen according to reception of the instruction by the reception unit, based on the setting information held by the holding unit, and a projection unit configured to project the menu screen according to a result of determination by the determination unit.

Further features of the present invention will become apparent from the following description of exemplary embodiments with reference to the attached drawings.

BRIEF DESCRIPTION OF THE DRAWINGS

FIGS. 5A to 5E are diagrams illustrating an example of marker shapes corresponding to operation instructions.

FIGS. 7A to 7E are diagrams illustrating an example of projection screens according to the exemplary embodiment.

DESCRIPTION OF THE EMBODIMENTS

An exemplary embodiment of the present invention will be described below with reference to the drawings.

Figure 1:
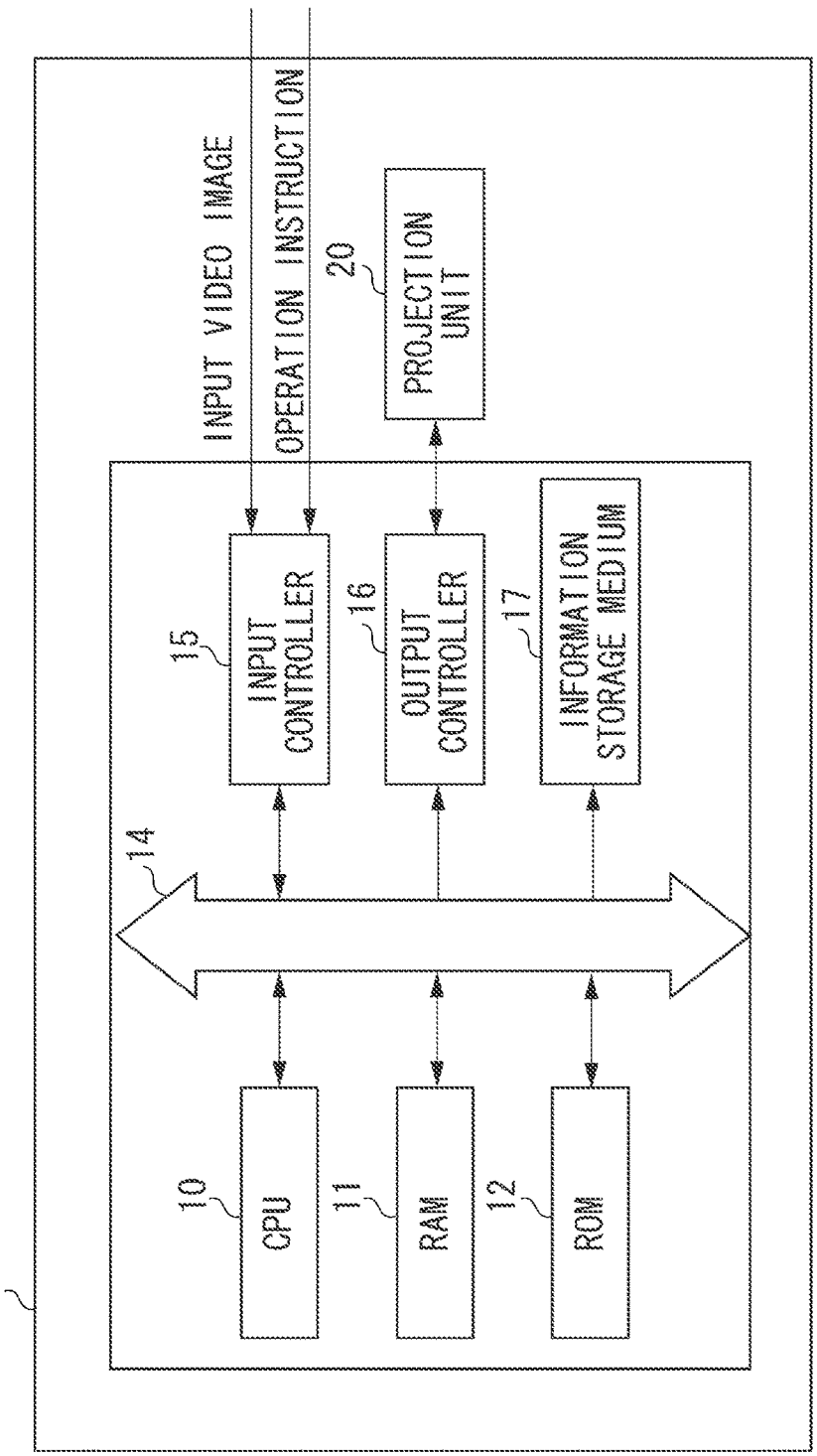
FIG. 1 is a diagram illustrating an example of a hardware configuration of a projector.

FIG. 1 is a diagram illustrating an example of a hardware configuration of a projector 1.

The projector includes, as its hardware configuration, a central processing unit (CPU) 10, a random access memory (RAM) 11, a read-only memory (ROM) 12, a system bus 14, an input controller 15, an output controller 16, an information storage medium 17, and a projection unit 20.

The CPU 10 controls the devices and controllers connected to the system bus 14 in a centralized manner. The ROM 12 stores programs such as an operating system (OS) which is a control program of the CPU 10, The ROM 12 further stores data needed to implement functions to be executed by each server or personal computer (PC). The RAM 11 functions as a main memory and a work area of the CPU 10, The CPU 10 loads programs needed in performing processing into the RAM 11 and executes the programs to perform various operations.

The input controller 15 controls input of a video image output from a video output device to be described below, and accepts a predetermined operation instruction related to setting of the projector 1 from an operation unit such as a remote controller to be described below. The output controller 16 controls image projection by the projection unit 20. The information storage medium 17 stores various types of data, including a boot program, font data, a user file, and a setting file. For example, the storage medium may include a holding unit configured to hold setting information.

For example, the CPU 10 executes processing for developing (rasterizing) an outline font into a display information area in the RAM 11 to enable display on the projection unit 20. A program related to processing of the exemplary embodiment is recorded, for example, on the information storage medium 17. The program is loaded into the RAM 11 and executed by the CPU 10 as needed. More specifically, the CPU 10 executes processing based on the program stored in the information storage medium 17 and the programs stored in the RUM 12 to implement a software configuration of the projector 1 and the processing of a flowchart to be described below.

Figure 2:
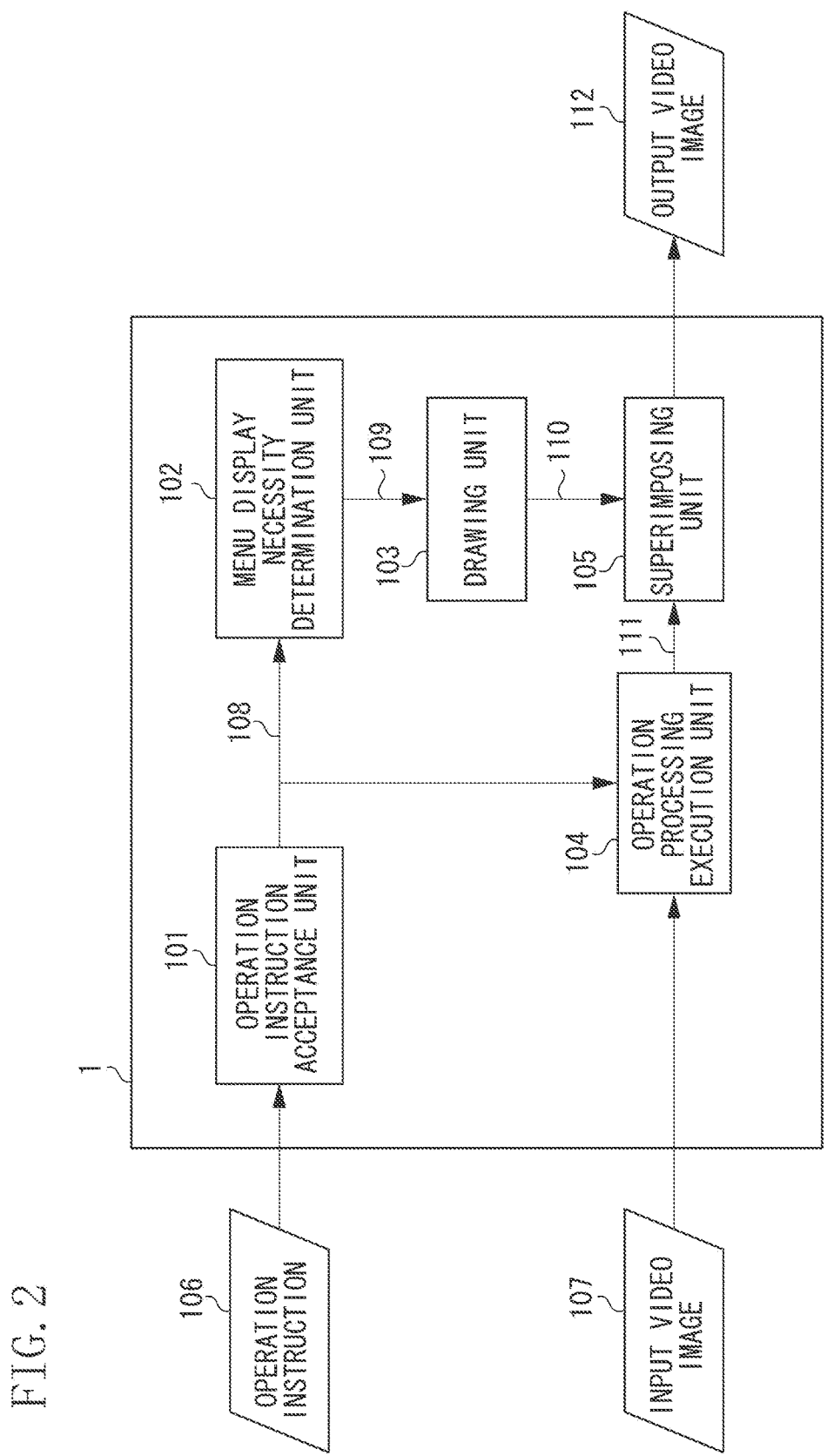
FIG. 2 is a diagram illustrating an example of a software configuration of the projector.

FIG. 2 is a diagram illustrating an example of the software configuration of the projector 1. When an operation instruction 106 and an input video image 107 are input, the projector 1 outputs an output video image 112.

The projector 1 includes, as its software configuration, an operation instruction reception unit 101, a menu display necessity determination unit 102, a drawing unit 103, an operation processing execution unit 104, and a superimposing unit 105.

When the operation instruction 106 is input, the operation instruction reception unit 101 outputs operation instruction contents 108 to the menu display necessity determination unit 102 and the operation processing execution unit 104. Herein, the operation instruction 106 is an operation instruction about the setting (for example, image quality adjustment) of the projector 1 given by an operation instruction device such as a remote controller.

When the operation instruction contents 108 is input, the menu display necessity determination unit 102 determines whether a menu needs to be displayed, according to whether the projector 1 is a master projector which displays a menu or a slave projector which does not display a menu. For example, the menu display necessity determination unit 102 determines whether the own apparatus is a master projector or a slave projector, based on a setting of the setting file stored in the information storage medium 17. The CPU 10 can change the setting of the setting file according to an operation instruction. The menu display necessity determination unit 102 outputs a drawing instruction 109 according to the necessity of the menu display to the drawing unit 103.

When the drawing instruction 109 is input, the drawing unit 103 draws both a menu and a marker or only a marker according to the drawing instruction contents 108, and outputs the resultant to the superimposing unit 105 as a drawing result 110. The drawing unit 103 further outputs the drawing position (s) of the menu and/or the marker to the superimposing unit 105. For example, in the examples of FIGS. 4 and 7A to 7E described below, the marker is in a preset drawing position at the lower right each projection screen. However, this is not intended to limit the present exemplary embodiment. The drawing position of the marker may be any one of the four corners of the projection screen, such as the lower left, the upper left, and the upper right. The marker is art example of an object corresponding to an operation instruction.

When the input video image 107 and the operation instruction contents 108 are input, the operation processing execution unit 104 executes processing corresponding to the operation instruction contents 108 on the input video image 107, and outputs a processed video image 111 to the superimposing unit 105. Herein, the processing corresponding to the operation instruction contents 108 refers to an adjustment of a color gamut or contrast of the video image. The processing by the operation processing execution unit 104 is an example of processing for changing a setting according to an operation instruction received after a menu is displayed.

The superimposing unit 105 receives the processed video image 111 and the drawing result 110. As described above, the drawing result 110 is both the menu and the marker, or the marker. The superimposing unit 105 performs processing for superimposing both the menu and the marker or only the marker on the processed video image 111. The superimposing unit 105 then outputs the superimposed video image to a set projection position as an output video image 112. The processed image 111 is an example of an execution result.

Figure 3:
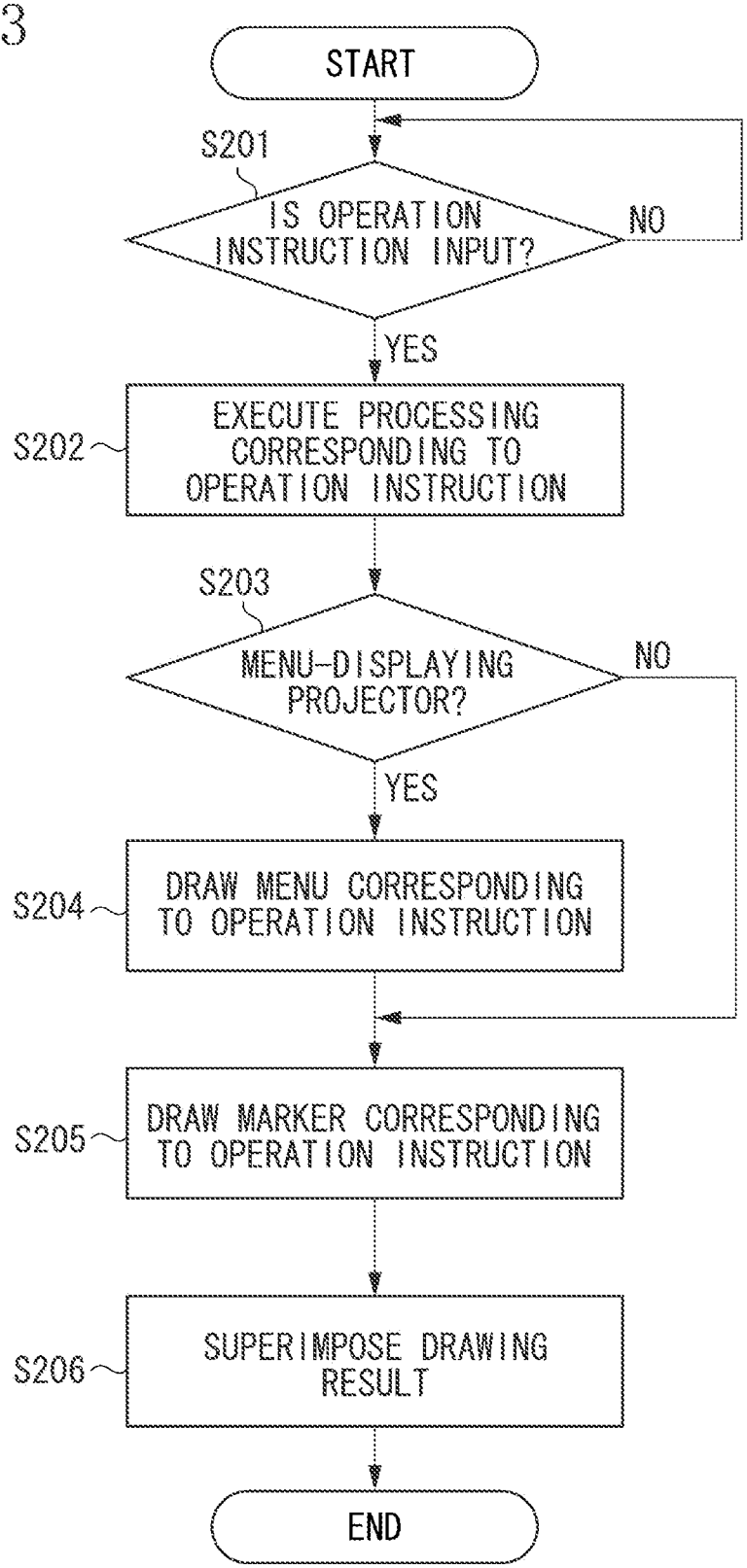
FIG. 3 is a flowchart illustrating an example of information processing of the projector.

FIG. 3 is a flowchart illustrating an example of information processing of the projector 1.

In step S201, the operation instruction reception unit 101 determines whether an operation instruction 106 is input. If the operation instruction reception unit 101 determines that an operation instruction 106 is input (YES in step S201), the processing proceeds to step S202. If an operation instruction 106 is not determined to be input (NO in step S201), the operation instruction reception unit 101 repeats the processing of step S201.

In step S202, the operation processing execution unit 104 executes processing corresponding to the operation instruction on an input video image 107. The processing of step S202 is executed regardless of whether the projector 1 is a master projector or a slave projector. After the operation processing execution unit 104 executes the processing corresponding to the operation instruction 106, the processing proceeds to step S203.

In step S203, the menu display necessity determination unit 102 determines whether the projector 1 is a menu-displaying projector. In the present exemplary embodiment, a projector that displays a menu is referred to as a master projector, and a projector that does not display a menu is referred to as a slave projector. That is, the menu display necessity determination unit 102 determines whether the projector 1 is a menu-displaying projector, based on whether the projector 1 is a master projector or a slave projector. If the menu display necessity determination unit 102 determines that the projector 1 is a master projector (YES in step S203), the processing proceeds to step S204. If the menu display necessity determination unit 102 determines that the projector 1 is a slave projector (NO in step S203), the processing proceeds to step S205.

In step S204, the drawing unit 103 performs processing for drawing a menu corresponding to the operation instruction 106. The processing of step S204 is performed only in the master projector. An example of the menu corresponding to the operation instruction 106 is a user interface for adjustment when image adjustment processing is performed. After the drawing unit 103 executes the processing for drawing the menu, the processing proceeds to step S205.

In step S205, the drawing unit 103 performs processing for drawing a marker corresponding to the operation instruction 106. The processing of step S205 is performed in both the master and slave projectors. The drawing unit 103 draws a marker that corresponds to the operation instruction 106 on a one-to-one basis. The correspondence between the operation instruction 106 and the marker is defined, for example, in the setting file stored in the information storage medium 17. In other words, the drawing unit 103 draws the marker corresponding to the operation instruction 106 based on the definition of the correspondence between the operation instruction 106 and the marker in the setting file.

In step S206, the superimposing unit 105 performs processing for superimposing both the drawn menu and marker, or only the marker, on the video image which has been subjected to the processing corresponding to the operation instruction 106. The video image generated in the superimposition processing of step S206 becomes the output video image 112 of the projector 1 according to the present exemplary embodiment.

FIGS. 4 and 5A to 5E illustrate the shapes of the menu and marker according to the present exemplary embodiment. The shapes of the menu and the marker illustrated here are just an example. The marker may have an arbitrary shape as long as the shape corresponds to the operation instruction 106 on a one-to-one basis, which is necessary to obtain an effect of the present exemplary embodiment.

Figure 4:
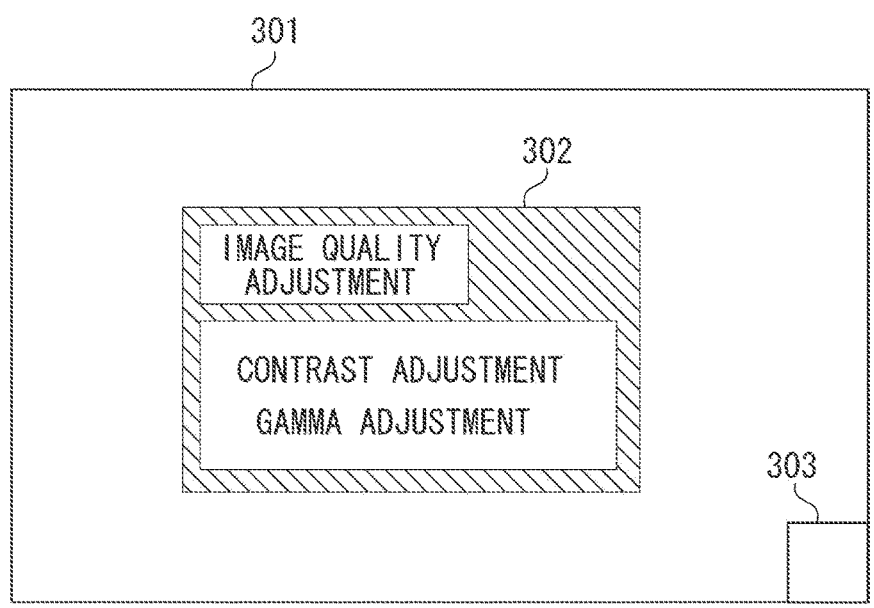
FIG. 4 is a diagram illustrating an example of a projection screen of a master projector according to an exemplary embodiment.

FIG. 4 is a diagram illustrating an example of a projection screen of the master projector which displays the menu and the marker. A menu 302 corresponding to an operation instruction 106 is arranged at the center of a projection screen 301. A marker 303 corresponding to the operation instruction 106 on a one-to-one basis is arranged at the lower right of the projection screen 301. FIGS. 5A to 5E are diagrams illustrating an example of marker shapes corresponding to operation instructions 106, obtained by extracting only the marker 303 illustrated in FIG. 4. A marker 401 of FIG. 5A illustrates the shape of a marker corresponding to an image quality adjustment button pressing operation. Similarly, a marker 402 of FIG. 5B illustrates the shape of a marker corresponding to a contrast adjustment selection operation. A marker 403 of FIG. 5C illustrates the shape of a marker corresponding to a gamma adjustment selection operation. A marker 404 of FIG. 5D and a marker 405 of FIG. 5E illustrate the shapes of a marker corresponding to an operation at the time of changing an adjustment amount. The markers 404 and 405 are ones corresponding to adjustment of a seek bar display. A seek bar 406 in the markers 404 and 405 moves to the left and right to implement a marker corresponding to an operation for increasing or decreasing the adjustment amount. The examples illustrated in FIGS. 5A to 5E include only markers having geometrically different internal shapes. However, markers of different colors may be associated with operation instructions 106.

Next, an operation example of a menu display method of a multi-projection system according to the exemplary embodiment will be described, with reference to FIGS. 6 to 8. The multi-projection system is an example of a projection system.

Figure 6:
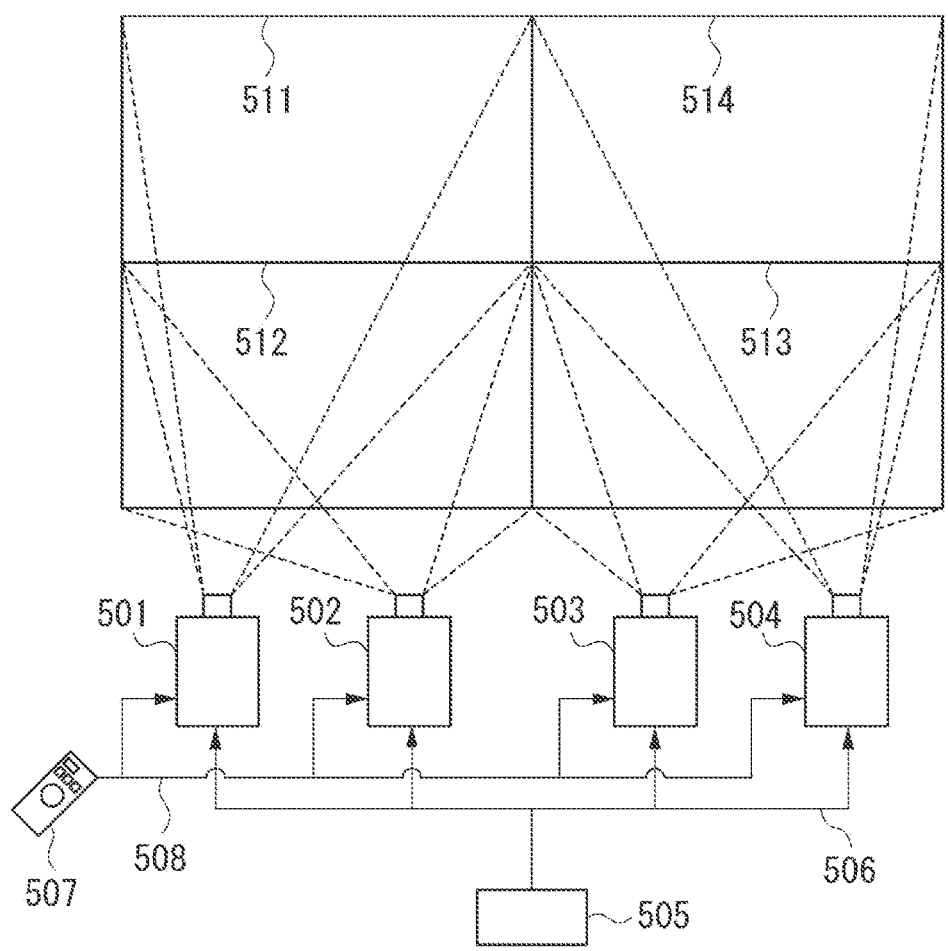
FIG. 6 is a diagram illustrating an example of a system configuration of a multi-projection system.

FIG. 6 is a diagram illustrating an example of a system configuration of a multi-projection system using the projector 1. As illustrated, in FIG. 6, the multi-projection system includes a plurality of projectors, namely, a projector 501, a projector 502, a projector 503, and a projector 504. The projectors 501, 502, 503, and 504 each have the same hardware configuration and software configuration as those of the foregoing projector 1. The projector 501 serves as a master projector. The projectors 502, 503, and 504 serve as slave projectors. The projectors 501, 502, 503, and 504 are connected to a video output device 505 via a video image transmission unit 506. The video output device 505 is a device capable of outputting a video image such as a PC. The video output device 505 transmits part of a screen to be constructed by multi-projection to the projectors 501, 502, 503, and 504. The video image transmission unit 506 includes Video Graphics Array (VGA) cables or Digital Visual Interface (DVI) cables, and has a function of transmitting only video images from the video output device 505 to the respective projectors 501, 502, 503, and 504. A remote controller 507 transmits an operation instruction 508 to the projectors 501, 502, 503, and 504. The operation instruction 508 is transmitted, for example, by using infrared rays which is a typical transmission method of a remote controller. A projection screen 511, a projection screen 512, a projection screen 513, and a projection screen 514 are projection screens of the projectors 501, 502, 503, and 504, respectively. The multi-projection system of FIG. 6 constructs one entire projection screen from the projection screens 511, 512, 513, and 514. The projection screen 511, 512, 513, and 514 are examples of a partial projection screen.

Next, the projection screens 511, 512, 513, and 514 will be described with reference to FIGS. 7A to 7E. The projection screens 511, 512, 513, and 514 are screens at the time that art operation instruction 508 is given from the remote controller 507 to the projectors 501, 502, 503, and 504.

Figure 7A:
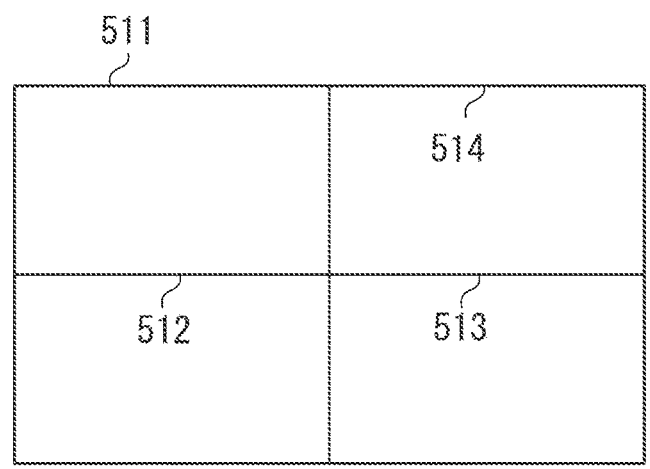

FIG. 7A illustrates the projection screens 511, 512, 513, and 514 in a state where there is no operation instruction 508 from the remote controller 507. The projection screen 511 of the master projector and the projection screens 512, 513, and 514 of the slave projectors do not display a menu or a marker.

Figure 7B:
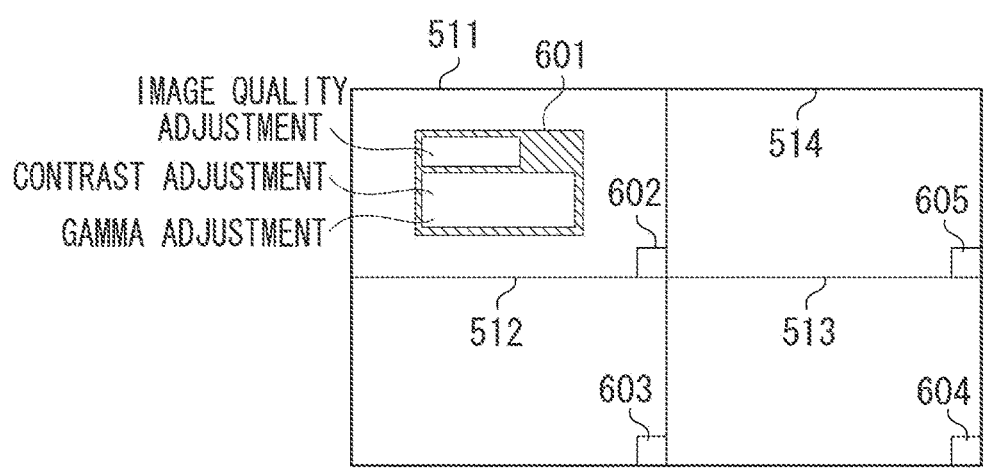

FIG. 7B illustrates the projection screens 511, 512, 513, and 514 when an image quality adjustment button is pressed as the operation instruction 508 from the remote controller 507. The projection screen 511 from the master projector displays a menu 601 and a marker 602 corresponding to the pressing of the image quality adjustment button. The projection screens 512, 513, and 514 of the slave projectors display only a marker 603, a marker 604, and a marker 605 corresponding to the pressing of the image quality adjustment button, respectively. FIG. 70 illustrates, the projection screens 511, 512, 513, and 514 when an operation instruction 508 for selecting a contrast adjustment is given. The projection screen 511 of the master projector displays a corresponding menu 606 and marker 607. The projection screens 512, 513, and 514 of the slave projectors display respective corresponding markers 608, 609, and 610.

FIG. 7D illustrates the projection screens 511, 512, 513, and 514 when an operation instruction 508 for increasing the adjustment amount is given. The projection screen 511 of the master projector displays a corresponding menu 611 and marker 612. The projection screens 512, 513, and 514 of the slave projectors display corresponding markers 613, 614, and 615. The markers 612, 613, 614, and 615 are markers corresponding to an operation on the adjustment amount, and the seek bars in the markers 612, 613, 614, and 615 move according to the operation.

FIG. 7E illustrates the projection screens 511, 512, 513, and 514 when the operation instruction 508 is ended. If the operation instruction 508 is ended, the menu and marker displayed on the projection screen 511 of the master projector during the operation and the markers on the projection screens 512, 513, and 514 of the slave projectors disappear.

If the marker of the master projector and those of the slave projectors as described above are the same, the user who gives the operation instruction 508 can check that the same operation is reflected on all the projectors.

In addition, for example, the drawing position of the marker on the projection screen 511 in FIGS. 7A to 7E to be described below may be the lower right, the drawing position of the marker on the projection screen 512 the upper right, the drawing position of the marker on the projection screen 513 the upper left, and the drawing position of the marker on the projection screen 514 the lower left. That is, the drawing positions of the markers may be different according to the positions of the respective projection screens (for example, the projection screens 511 to 514 in FIGS. 7A to 7E) constituting the one large projection screen (for example, the projection screen formed by combining the projection screens 511 to 514 in FIGS. 7A to 7E). For example, if the drawing position of the marker on the projection screen 511 is the lower right, the drawing position of the marker on the projection screen 512 the upper right, the drawing position of the marker on the projection screen 513 the upper left, and the drawing position of the marker on the projection screen 514 the lower left, the markers concentrate on the center of the one large projection screen. This allows the user to check whether the same setting is reflected on all the projectors by simply viewing the center of the one large projection screen.

Figure 8:
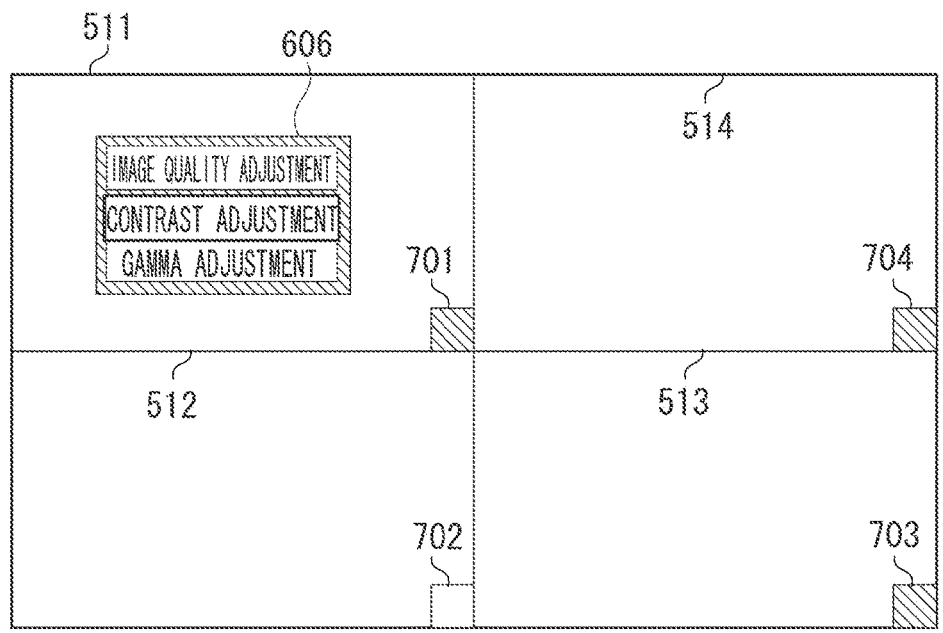
FIG. 8 is a diagram illustrating an example of the projection screens according to the exemplary embodiment.

FIG. 8 illustrates the projection screens 511, 512, 513, and 514 when an operation instruction 508 given by the user is not reflected on all the projectors 501, 502, 503, and 504. In FIG. 8, the operation instruction 508 for selecting a contrast adjustment illustrated in FIG. 7D is given, and a marker 702 on the projection screen 512 of the projector 502 which is a slave projector is different from the markers of the other projectors 501, 503, and 504. In such a case, the user who gives the operation instruction 508 can check that the same operation is not reflected on all the projectors 501, 502, 503, and 504. Possible reasons why the same operation is not reflected on all the projectors 501, 502, 503, and 504 may be that the operation instruction 508 given from the remote controller 507 by using infrared rays is not properly transmitted to all the projectors 501, 502, 503, and 504, or processing corresponding to the operation instruction 508 within the projector has failed. In any case, the user can check that the same processing is not reflected on all the projectors 501, 502, 503, and 504.

As described above, according to the processing described in the present exemplary embodiment, the projectors 501, 502, 503, and 504 constituting the multi-projection system can provide a menu display such as the one illustrated in FIGS. 7A to 7E. Accordingly, the user can check that the same operation is reflected on all the projectors 501, 502, 503, and 504. In other words, the projector's 501, 502, 503, and 504 having the function of the present exemplary embodiment do not need to include a network interface for transmitting and receiving the operation contents to/from each other. According to the processing described in the present exemplary embodiment, a technique for enabling setting and confirmation of the setting of all projection apparatuses constituting a system can thus be provided without an increase in cost.

Next, a marker shape different from those illustrated in FIGS. 4 and 5A to 5E will be described.

Figure 9:
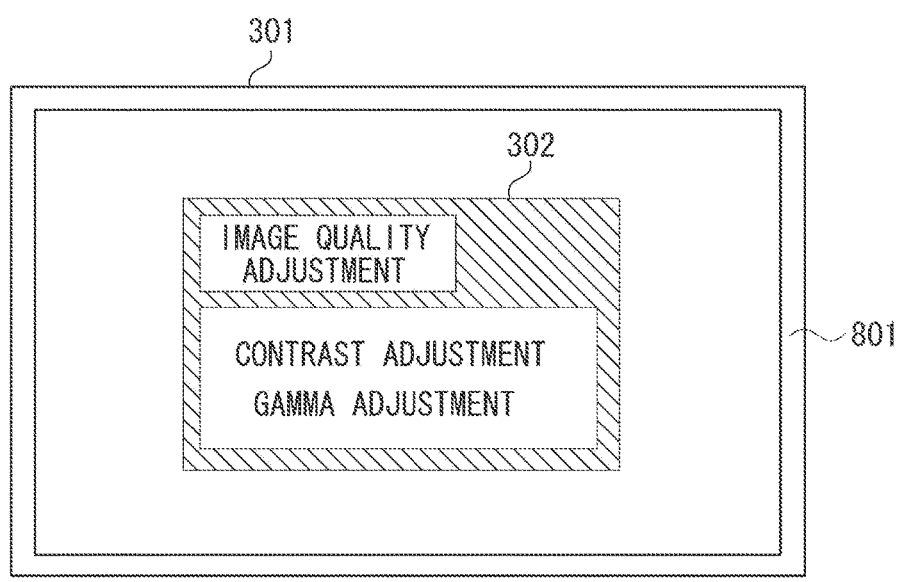
FIG. 9 is a diagram illustrating an example of the projection screen of the master projector according to the exemplary embodiment.

FIG. 9 is a diagram illustrating a projection screen of a projector that displays a menu and a marker, as is the case with FIG. 4. A menu 302 corresponding to an operation instruction is arranged in the center of a projection screen 301. A marker 801 corresponding to the operation instruction on a one-to-one basis is arranged inside the frame of the projection screen 301. If markers are implemented in such a frame shape, it is difficult to represent different markers by different geometrical shapes. However, if different markers can be represented by different colors, the same effect as that of the exemplary embodiment can be obtained.

Figure 10:
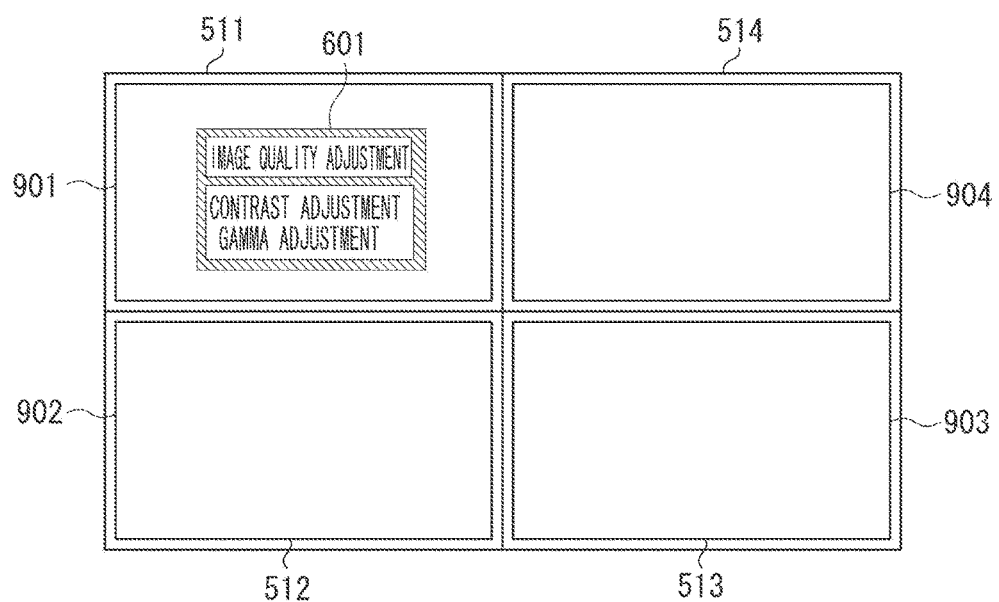
FIG. 10 is a diagram illustrating an example of the projection screens according to the exemplary embodiment.

FIG. 10 is a diagram illustrating an entire projection screen of the multi-projection system according to the exemplary embodiment. A marker 901, a marker 902, a marker 903, and a marker 904 are arranged in the projection screens 511, 512, 513, and 514 which are illustrated in FIGS. 6 and 7A to 7E of the exemplary embodiment. If such a marker shape is employed, the user can glance over the entire screen output by the multi-projection system to check the state of reflection of an operation instruction from the presence or absence of a difference between the markers 901, 902, 903, and 904. The markers 901, 902, 903, and 904 are examples of an object which position is set at a specified distance inside the frame constituting a partial projection screen.

The exemplary embodiment has been described in detail above. However, the present invention is not limited to any particular exemplary embodiment. For example, in the foregoing exemplary embodiment, the software configuration illustrated in FIG. 2 is described which is implemented by the CPU 10 executing processing based on the programs. However, all or part of the units illustrated in FIG. 2 may be implemented in the projector 1 as a hardware configuration.

The drawing unit 103 may determine whether to draw a marker like those of FIGS. 4 and 5A to 5E or draw a marker like that of FIG. 9 based on the setting of the setting file stored in the information storage medium 17, and switch the drawing method of the marker according to the determination result. The CPU 10 can change the setting of the setting file according to an operation instruction.

According to the configuration of the present exemplary embodiment, a technique for enabling setting and the confirmation of the setting of a plurality of projection apparatuses constituting a system with use of fewer components can be provided.

OTHER EMBODIMENTS

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (5) and/or controlling the one or more circuits to perform the functions of one or more of the above-described embodiment (s) The computer may comprise one or more processors (e.g., central processing unit (CPU), micro processing unit (MPU)) and may include, a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DUD), or Blu-ray Disc (BD)™) flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-123139, filed Jun. 18, 2015, which is hereby incorporated by reference herein in its entirety.

What is claimed is:

1. A projection apparatus comprising:
a holding unit configured to hold setting information about a role of the projection apparatus among a plurality of projection apparatuses for executing multi-projection;
a reception unit configured to receive an instruction regarding setting of a parameter of the projection apparatus;
a determination unit configured to determine whether to display a menu screen, based on the setting information held by the holding unit, upon reception of a first instruction by the reception unit, the first instruction regarding displaying the menu screen for changing the parameter of the projection apparatus;
- a projection unit configured to project image according to a result of the determination by the determination unit; and
- a changing unit configured to, regardless of whether the projection unit projects the menu screen, change the parameter of the projection apparatus upon reception of a second instruction by the reception unit later than reception of the first instruction by the reception unit, the second instruction regarding changing the parameter of the projection apparatus.

2. The projection apparatus according to claim 1, wherein the setting information is information indicating whether the projection apparatus is a master projector having a role in outputting a control signal for controlling another projection apparatus among the plurality of projection apparatuses, or a slave projector having a role in receiving the control signal output from the master projector.

3. The projection apparatus according to claim 1, further comprising a marker display control unit configured to make the projection unit project a marker image upon reception of the first instruction by the reception unit regardless of the setting information held by the holding unit, wherein the marker image represents the first instruction is received by the reception unit.

4. The projection apparatus according to claim 3, further comprising:
- a decision unit configured to decide a type of a parameter which is changed based on the second instruction, based on the first instruction received by the reception unit; and
- a marker type determination unit configured to determine a type of the marker image to be projected by the projection unit, based on the type of the parameter decided by the decision unit.

5. The projection apparatus according to claim 4, wherein the marker type determination unit is configured to determine the type of the marker image based on the type of the parameter decided by the decision unit so that marker images of different patterns are projected by the projection unit between when the type of the parameter decided by the decision unit is a first type and when the type of the parameter decided by the decision unit is a second type different from the first type.

6. The projection apparatus according to claim 4, wherein the marker type determination unit is configured to determine the type of the marker image based on the type of the parameter decided by the decision unit so that marker images of different colors are projected by the projection unit between when the type of the parameter decided by the decision unit is a first type and when the type of the parameter decided by the decision unit is a second type different from the first type.

7. The projection apparatus according to claim 3, further comprising a marker position determination unit configured to determine a position of the marker image to be projected by the projection unit, based on a projection area of the projection apparatus in the multi-projection.

8. The projection apparatus according to claim 7, wherein the marker position determination unit is configured to determine the position of the marker image to be projected by the projection unit, based on the projection area of the projection apparatus in the multi-projection so that the marker image to be projected by the projection unit and a marker image projected by another projection apparatus among the plurality of projection apparatuses adjoin to each other.

9. A control method of a projection apparatus comprising:
- obtaining setting information about a role of the projection apparatus among a plurality of projection apparatuses for executing multi-projection from a memory;
- receiving an instruction regarding setting of a parameter the projection apparatus;
- determining, based on the setting information obtained from the memory, whether to display a menu screen upon reception of a first instruction, the first instruction regarding displaying the menu screen for changing the parameter of the projection apparatus;
- making a projection unit project an image according to a result of the determining whether to display the menu screen; and
- changing, regardless of whether the menu screen is projected, the parameter of the projection apparatus upon reception of a second instruction later than reception of the first instruction, the second instruction regarding changing the parameter of the projection apparatus.

10. The control method according to claim 9, wherein the setting information is information indicating whether the projection apparatus is a master projector having a role in outputting a control signal for controlling another projection apparatus among the plurality of projection apparatuses or a slave projector having a role in receiving the control signal output from the master projector.

11. The control method according to claim 9, wherein a marker image is projected by the projection unit upon the reception of the first instruction regardless of the setting information obtained from the memory, wherein the marker image represents the first instruction is received.

12. A non-transitory storage medium storing a program for causing a computer to execute a method of controlling a projection apparatus, the control method comprising:
- obtaining setting information about a role of the projection apparatus among a plurality of projection apparatuses for executing multi-projection, from a memory;
- receiving an instruction regarding setting of a parameter of the projection apparatus;
- determining, based on the setting information obtained from the memory, whether to display a menu screen, upon reception of a first instruction, the first instruction regarding displaying the menu screen for changing the parameter of the projection apparatus; and
- making a projection unit project an image according to a result of the determining whether to display the menu screen; and
- changing, regardless of whether the projection unit projects the menu screen, the parameter of the projection apparatus upon reception of a second instruction later than reception of the first instruction, the second instruction regarding changing the parameter of the projection apparatus.

13. The non-transitory storage medium according to claim 12, wherein the setting information is information indicating whether the projection apparatus is a master projector having a role in outputting a control signal for controlling another projection apparatus among the plurality of projection apparatuses, or a slave projector having a role in receiving the control signal output from the master projector.

14. The non-transitory storage medium according to claim 12, wherein a marker image is projected by the projection unit upon the reception of the first instruction regardless of the setting information obtained from the memory, wherein the marker image represents the first instruction is received.

\* \* \* \* \*